No. 879,714. PATENTED FEB. 18, 1908.
I. L. & J. ABE.
LOCK NUT.
APPLICATION FILED JULY 31, 1907.
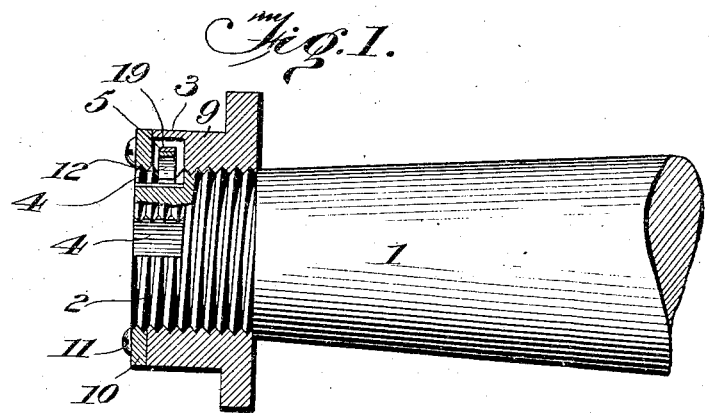
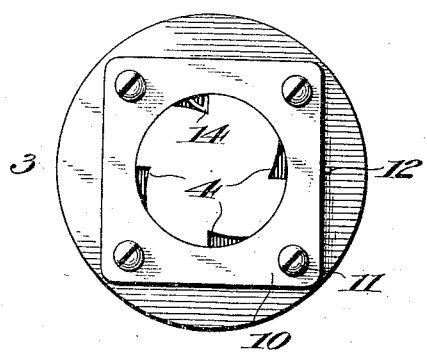
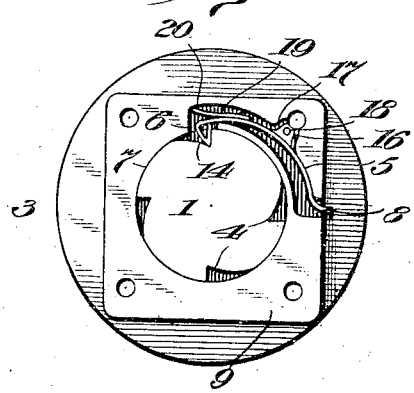
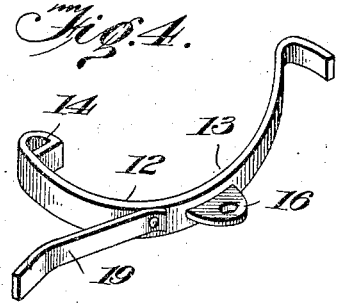
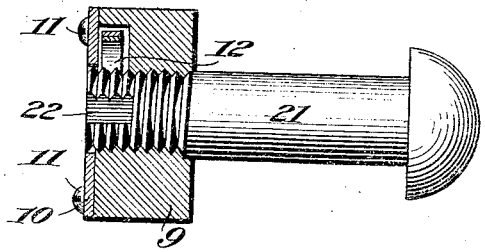
Witnesses:
H. O. Ackman Jr.
C. Bradway.
Inventors:
Jacob Abe
Ira L. Abe
By Victor J. Evans
Atty.

UNITED STATES PATENT OFFICE.

IRA L. ABE AND JACOB ABE, OF ALASKA, WEST VIRGINIA.

LOCK-NUT.

No. 879,714.	Specification of Letters Patent.	Patented Feb. 18, 1908.

Application filed July 31, 1907. Serial No. 386,407.

*To all whom it may concern:*

Be it known that we, IRA L. ABE and JACOB ABE, citizens of the United States, residing at Alaska, in the county of Mineral and State of West Virginia, have invented new and useful Improvements in Lock-Nuts, of which the following is a specification.

This invention relates to devices for locking nuts and bolts together in such a manner as to prevent the nuts from working loose and at the same time permitting the device to be unlocked or locked by the application or removal of a wrench to or from the nut.

The invention has for one of its objects to improve and simplify the construction and operation of devices of this character so as to be comparatively easy and inexpensive to manufacture, composed of few parts, readily manipulated, and effective in use.

A further object of the invention is the provision of a nut locking device comprising a nut provided with a chamber in which is mounted a spring-pressed locking member in the form of a lever, the said locking member having one extremity formed into a hook or tooth for engaging in a groove or recess of the bolt to which the nut is applied, while the opposite end of the locking member projects out of the chamber so that the locking member can be released and held in inoperative position by the application of a wrench to the nut for screwing the latter on the bolt or removing it therefrom.

With these objects in view and others, as will appear as the description proceeds, the invention comprises the various novel features of construction and arrangement of parts which will be more fully described and set forth with particularity in the claims appended hereto.

In the accompanying drawing, which illustrates one of the embodiments of the invention, Figure 1 is a fragmentary sectional view of an axle with the nut locking device applied thereto. Fig. 2 is an end view of the nut. Fig. 3 is a similar view with the end plate of the nut removed. Fig. 4 is a perspective view of the locking member. Fig. 5 is a view of an ordinary bolt and nut in section having the nut locking mechanism applied thereto.

Similar reference characters are employed to designate corresponding parts throughout the several views.

Referring to the drawing, 1 designates an axle spindle that has its outer end threaded at 2 in the usual manner for the reception of the wheel-retaining nut 3, there being one or more longitudinally extending recesses or grooves 4 in the threaded portion 2 of the spindle for the purpose hereinafter to appear. The nut 3 is provided with an arcuate chamber 5 that has its end at 6 opening into the bore 7 of the nut, while the opposite end 8 is open at one side of the nut, the chamber being concentric with the bore of the nut in approximately a quadrant of a circle. To construct the chamber 5, the nut is preferably made of two parts and the chamber is formed in the outer surface of the part 9, and the open side of the chamber is closed by a plate 10 which is secured to the part 9 by screws 11 or other suitable fastenings.

In the chamber 5 is a locking device 12 that preferably comprises a strip of stiff metal 13 that is curved to be assembled in the chamber and has one end bent into a V-shaped hook or tooth 14 which projects through the opening 6 to engage any one of the grooves or notches 4 of the spindle. The strip 13 is of such a length that the end opposite from the hook 14 will extend out of the opening 8 when the member 12 is in locking position, as shown in Fig. 3, and will be pushed entirely into the said opening when a wrench is applied to the nut. The strip 13 is provided with an apertured lug 16 that projects from the convex side thereof and extends into a recess 17 in the concaved wall of the chamber 5, and through the aperture of the said lug extends a pivot 18, whereby the locking member is mounted to oscillate. At a suitable point on the member 12, as for instance, between the lug 16 and hook 14, is a leaf spring 19 that has its outer end slightly curved and bearing in the corner 20 of the chamber 5, the said spring being constantly under a tension tending to hold the member 12 in locking position, and at the same time permitting the member to swing to unlocking position when it is desired to apply or remove the nut.

The nut locking device is adapted for other uses than with wagon axles for preventing the wheels from working off, and for the purpose of illustrating another use, the nut locking device is shown applied to an ordinary bolt in Fig. 5. In this figure, the bolt 21 is provided with one or more notches 22 in its threaded portion for receiving the gripping end of the locking member, the locking device being of the same construction as that heretofore described.

In practice, a wrench is applied to the nut in the usual manner and by the wrench engaging the outer end of the strip 13, the locking device is thrown to an inoperative position against the tension of the spring 19 so as to withdraw the hook portion 14 into the chamber 5. The nut can then be screwed on or removed without the locking device interfering and as soon as the wrench is removed, the locking device will swing on its pivot by reason of the tension of the spring 19 and thereby cause the hook 14 to return to locking position. It will thus be seen that the nut can be readily applied or removed and the locking device is automatic in its action.

From the foregoing description, taken in connection with the accompanying drawing, the advantages of the construction and of the method of operation will be readily apparent to those skilled in the art to which the present invention appertains, and while I have described the principle of operation of the invention, together with the apparatus which I now consider to be the best embodiment thereof, I desire to have it understood that the apparatus shown is merely illustrative and that such changes may be made when desired as are within the scope of the claims.

Having thus described the invention, what I claim is:—

1. The combination of a threaded member provided with one or more depressions, a nut on the member having an arcuate chamber open at one end to communicate with the bore of the nut and open at its opposite end in one of the side surfaces of the nut, and a locking device in the chamber, said device consisting of an arcuate strip bent inwardly into a hook at one end and shaped to move in and out through the inner opening of the chamber for engaging or disengaging the depressions of the said member and having its outer end bent outwardly in the opposite direction from the hook and projecting normally out of the other opening of the chamber, an apertured lug formed on the member at an intermediate point on the same, a pivot in the chamber extending through the aperture of the lug, and a leaf spring secured to the member and terminating adjacent the hook of the latter and engaging the wall of the chamber for holding the member in locking position.

2. The combination of a threaded member having one or more depressions; a nut thereon composed of two parts, one part having a chamber opening into the bore of the nut at one end and at one side of the nut at the opposite end, one side of the chamber being closed by the second part of the nut, and fastening devices for securing the parts of the nut together; and a locking device in the said chamber, said locking device comprising a strip of metal having one end bent into an inwardly extending V-shaped hook arranged to project through the opening at the inner end of the chamber for engaging in a depression of the said threaded member, and the opposite end being bent outwardly to project out of the outer open end of the chamber to be engaged by a wrench, a lug formed on the said member at a point intermediate the ends thereof, a pivot engaging in an opening in the lug for removably holding the member in the chamber and to permit movement thereof, and a leaf spring secured at one end to the member at a point intermediate the lug and inner end and having its opposite end disposed adjacent the hook to engage the wall of the chamber for holding the member in locking position.

In testimony whereof we affix our signatures in presence of two witnesses.

IRA L. ABE.
JACOB ABE.

Witnesses:
ROBERT M. JOHNSON,
ALBERT RILEY.